United States Patent
Takagi

(10) Patent No.: US 11,225,254 B2
(45) Date of Patent: Jan. 18, 2022

(54) DRIVING SUPPORT DEVICE

(71) Applicant: TOYOTA JIDOSHA KABUSHIKI KAISHA, Toyota (JP)

(72) Inventor: Yuka Takagi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/276,022

(22) Filed: Feb. 14, 2019

(65) Prior Publication Data

US 2019/0256095 A1    Aug. 22, 2019

(51) Int. Cl.
  *B60W 30/18* (2012.01)
  *B60W 30/09* (2012.01)
  *B60W 50/14* (2020.01)

(52) U.S. Cl.
  CPC ...... *B60W 30/18036* (2013.01); *B60W 30/09* (2013.01); *B60W 50/14* (2013.01); *B60W 2050/143* (2013.01); *B60W 2510/1005* (2013.01); *B60W 2520/28* (2013.01); *B60W 2540/10* (2013.01); *B60W 2540/12* (2013.01); *B60W 2552/15* (2020.02)

(58) Field of Classification Search
  CPC .......................... B60W 30/18036; B60W 30/09
  See application file for complete search history.

(56) References Cited

U.S. PATENT DOCUMENTS

| | | | |
|---|---|---|---|
| 2012/0322617 A1* | 12/2012 | Takahashi | F16H 59/44 477/96 |
| 2014/0025267 A1* | 1/2014 | Tezuka | B60W 30/18027 701/51 |
| 2017/0008534 A1 | 1/2017 | Nakatsuka et al. | |
| 2017/0327096 A1* | 11/2017 | Mochida | B60W 30/146 |
| 2019/0344802 A1* | 11/2019 | Yamashita | B60W 30/146 |

FOREIGN PATENT DOCUMENTS

| | | | |
|---|---|---|---|
| CN | 106335365 A | | 1/2017 |
| JP | 6-299880 A | | 10/1994 |
| JP | 2013155631 A | * | 8/2013 |
| JP | 2013-226930 A | | 11/2013 |

* cited by examiner

*Primary Examiner* — Thomas G Black
*Assistant Examiner* — Tarek Elarabi
(74) *Attorney, Agent, or Firm* — Sughrue Mion, PLLC

(57) ABSTRACT

A driving support ECU 10 determine that a mistaken acceleration operation condition is satisfied when a time from a first time point to a second time point is equal to or shorter than a predetermined threshold time (T2th), while a shift position is at a reverse position (R) for driving the vehicle backward. The first time point is a time point at which the driver does not operate the brake operation member. The second time point is a time point at which an index value corresponding to an acceleration operation amount satisfies a predetermined index value condition to be satisfied when the driver performs a predetermined sudden operation of the acceleration operation member. The driving support ECU make the driving force when the mistaken acceleration operation condition is satisfied smaller than the driving force when the mistaken acceleration operation condition is not satisfied.

9 Claims, 7 Drawing Sheets

DRIVING SUPPORT DEVICE

BACKGROUND

Technical Field

The present invention relates to a driving support device configured to be able to prevent a vehicle from accelerating excessively in response to a mistaken acceleration operation which a driver performs by mistake when the driver drives the vehicle backward.

Related Art

Hitherto, as proposed in Japanese Patent Application Laid-open No. 2012-226930, a driving support device (hereinafter referred to as a "proposed device") has been known, which makes "a throttle valve opening degree with respect to an acceleration opening degree when a busy condition is satisfied" smaller than "the throttle valve opening degree with respect to the acceleration opening degree when the busy condition is not satisfied", while a vehicle is driven backward (the vehicle backs). The busy condition is satisfied when a busy degree of a driving operation calculated based on a vehicle signal is equal to or greater than a threshold.

The proposed device is configured to increase the busy degree when the driver performs an acceleration operation within a period from a "shift change time point at which the driver performs a shift change" to a "time point at which a predetermined time elapses from the shift change time point".

SUMMARY

A driver tends to drive the vehicle backward while performing a brake operation and stopping the brake operation (for examples, while repeating stepping on and releasing the brake pedal). Thus, while the driver drives the vehicle backward, the driver may perform the acceleration operation by mistake although the driver has his/her intention of performing the brake operation. Even when and after the predetermined time elapses from a time point (hereinafter, referred to as a "shift position changing time point") at which the driver changes a shift lever position to a reverse range, there is a relatively high probability that the driver performs such acceleration operation by mistake (referred to as a "mistaken acceleration operation").

When the driver performs the mistaken acceleration operation after a time point at which the predetermined time elapses from the shift position changing time point, the proposed device cannot increase the busy degree. Because of this, the proposed device cannot take appropriate actions against the mistaken acceleration operation.

The present invention has been made to solve the problem described above. The present invention has an object to provide a driving support device configured to detect, as correctly/certainly as possible, "the mistaken acceleration which is often performed when the driver drives the vehicle backward with performing the brake operation and stopping the brake operation" after the time point at which the predetermined time elapses from the shift position changing time point, so as to be able to prevent the vehicle from accelerating suddenly when the mistaken acceleration operation is detected.

A driving support device (hereinafter, referred to as a "present device") according to the present disclosure comprises:

an acceleration operation amount acquisition unit (22, 10, and Step 310) for acquiring an acceleration operation amount (AP) of an acceleration operation member (22a) which a driver operates in order to increase driving force generated by a drive device (40) of a vehicle;

a brake operation determination unit (23, 10, and Step 310) for determining whether or not the driver operates a brake operation member (23a) which the driver operates in order to increase braking force generated by a brake device (50) of the vehicle;

a shift position detection unit (24, 10, and Step 310) for detecting a shift position (SP) of the vehicle;

a limitation unit (31, 40, 41, 10, Step 330, and Step 345) configured to:

determine that a mistaken acceleration operation condition is satisfied when a time from a first time point (Step 475) to a second time point ("Yes" at Step 430) is equal to or shorter than a predetermined threshold time ("Yes" at Step 485), while the shift position is at a reverse position (R) for driving the vehicle backward ("Yes" at Step 320);

wherein the first time point is a time point at which the brake operation determination unit determines that the driver does not operate the brake operation member ("Yes" at Step 435, and "Yes" at Step 465), and the second time point is a time point at which an index value which changes in response to the acceleration operation amount satisfies a predetermined index value condition to be satisfied when the driver performs a predetermined sudden operation of the acceleration operation member ("Yes" at Step 430), and make the driving force (refer to MapS(AP)) varied in response to the acceleration operation amount when the mistaken acceleration operation condition is satisfied ("Yes" at Step 485) smaller than the driving force (refer to MapL (AP)) varied in response to the acceleration operation amount when the mistaken acceleration operation condition is not satisfied (Step 345 and Step 330).

The present device determines that the mistaken acceleration operation condition becomes satisfied when the time (time length) from the first time point (a braking-off time point) to the second time point (the time point at which the index values satisfies the index value condition) is equal to or shorter than the predetermined threshold time. In this case, the present device makes the driving force varied in response to the acceleration operation amount smaller than the driving force varied in response to the acceleration operation amount when the mistaken acceleration operation condition is not satisfied. Therefore, even after the predetermined time elapses from the shift position changing time point, the present device can detect the mistaken acceleration operation certainly, and can prevent the vehicle from accelerating suddenly by the mistaken acceleration operation.

According to one embodiment of the present disclosure, the limitation unit is configured to:

adopt the acceleration operation amount as the index value, and determine that the index value satisfies the index value condition ("Yes" at Step 430) when the acceleration operation amount is equal to or greater than a predetermined threshold operation amount (AP≥APth).

When the driver performs the mistaken acceleration operation, the acceleration operation amount tends to become greater. The present device according to this embodiment determines that the index value satisfies the index value condition when the acceleration amount is equal to or greater than the threshold operation amount. Therefore, this device can detect the mistaken acceleration operation more certainly.

According to one embodiment of the present disclosure, the limitation unit is configured to:

adopt each of the acceleration operation amount and an increase speed of the acceleration operation amount as the index value, and determine that the index value satisfies the index value condition ("Yes" at Step 430) when the acceleration operation amount is equal to or greater than a predetermined threshold operation amount (AP≥APth) and the increase speed of the acceleration operation amount is equal to or higher than a predetermined threshold speed (APV≥APVth).

When the driver performs the mistaken acceleration operation, the acceleration operation amount tends to become greater, and the increase speed of the acceleration operation amount tends to become higher. The present device according to this embodiment determines that the index value satisfies the index value condition when the acceleration amount is equal to or greater than the threshold operation amount and the increase speed of the acceleration operation amount is equal to or higher than the threshold speed. Therefore, this device can detect the mistaken acceleration operation more certainly.

According to one embodiment of the present disclosure, the driving support device further comprises a slope determination unit (26, 10, and Step 720 through Step 730) for determining whether or not the vehicle is located on a slope which the vehicle goes up when the vehicle is driven backward, and the limitation unit is configured to:

set the threshold time to a first threshold time (UT2th) when the slope determination unit determines that the vehicle is not located on the slope ("No" at Step 605), and set the threshold time to a second threshold time (ST2th) which is shorter than the first threshold time when the slope determination unit determines that the vehicle is located on the slope ("Yes" at Step 605).

A vehicle longitudinal direction component of the gravitational acceleration is applied to the vehicle (or acts) in a forward direction FD of the vehicle on the slope (a reverse ascent slope) which the vehicle goes up (ascends) when the vehicle is backing. Because of this, the vehicle is going to move forward. Therefore, the driver operates the acceleration operation member earlier (more rapidly/quickly) than usual for preventing the vehicle from moving forward. When the vehicle is located on the reverse ascent slope, this device sets the threshold time to the second threshold time shorter than the first threshold time. This allows the device to decrease the possibility that such intentional acceleration operation is determined as the mistaken acceleration operation. As a result, this device can decrease the possibility that the driving force decrease control for making the driving force smaller than the driving force in normal is performed while the intentional acceleration operation is performed. Accordingly, this device can decrease an occurrence frequency of a situation where the driving force decrease control annoys the driver.

In the above description, in order to facilitate the understanding of the invention, reference symbols used in embodiment of the present invention are enclosed in parentheses and are assigned to each of the constituent features of the invention corresponding to the embodiment. However, each of the constituent features of the invention is not limited to the embodiment as defined by the reference symbols. Other objects, other features, and accompanying advantages of the present disclosure can be readily understood from a description of the embodiments of the present disclosure provided referring to the accompanying drawings.

DETAIL DESCRIPTION

Figure 1:
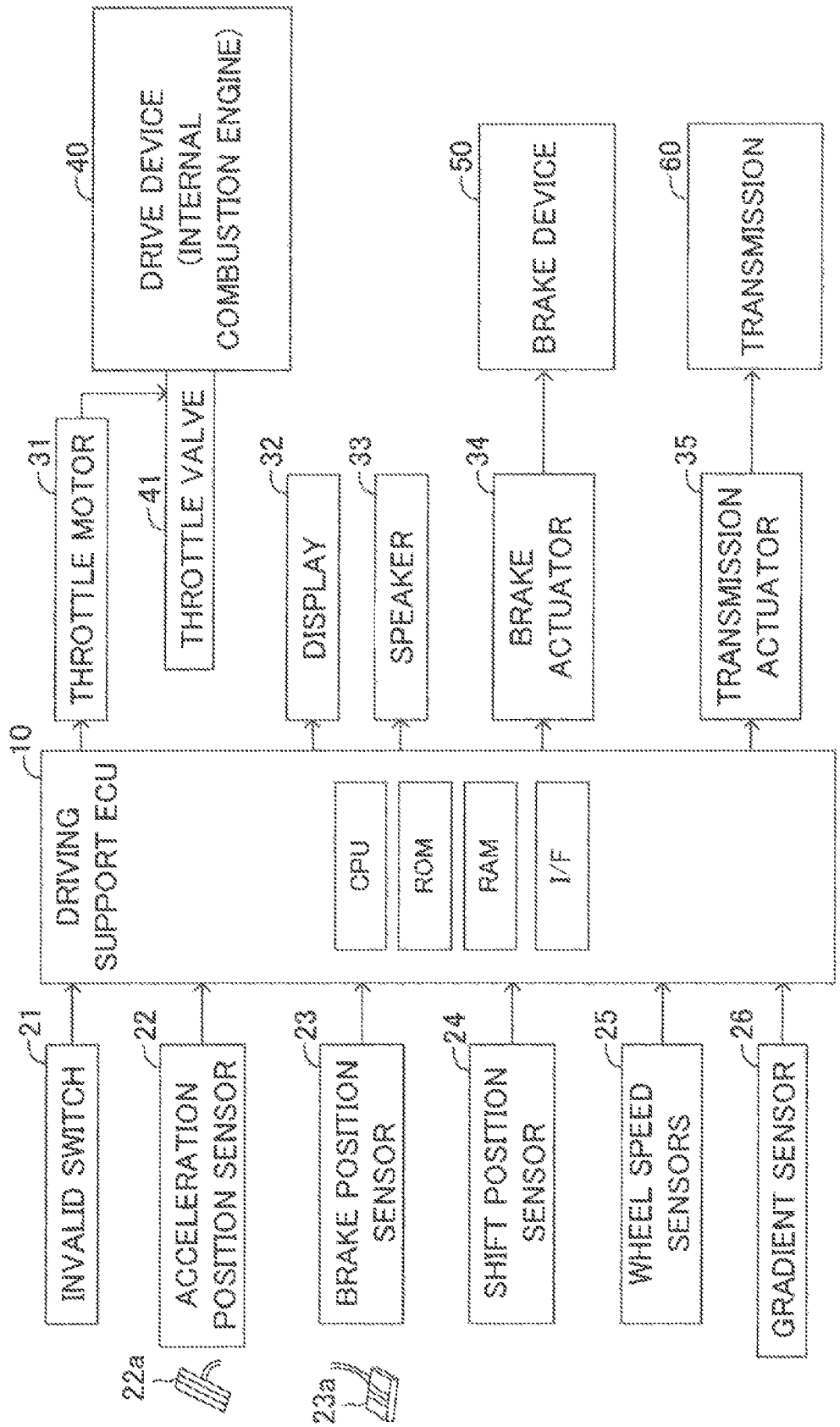
FIG. 1 is a schematic system configuration diagram of a driving support device (the present support device) according to an embodiment.

A driving support device/apparatus (hereinafter may be referred to as a "the present support device") according to an embodiment of the present invention is applied to a vehicle. As shown in FIG. 1, the present support device comprises a driving support ECU 10 (hereinafter referred to as a "DSECU 10").

The DSECU 10 is an "Electronic Control Unit" which includes a microcomputer as a main part, and is connected to other ECUs (not shown) via a CAN (Controller Area Network) to be able to mutually transmit and receive information to/from those ECUs. In this specification, the microcomputer includes a CPU, a ROM, a RAM, a nonvolatile memory, an interface (I/F), and the like. The CPU achieves various functions through executing instructions (program, routine) stored in the ROM.

The present support device comprises, in addition to the DSECU 10, an invalid switch 21, an acceleration position sensor 22, a brake position sensor 23, a shift position sensor 24, wheel speed sensors 25, a gradient sensor 26, a throttle motor 31, a display 32, a speaker 33, a brake actuator 34, and a transmission actuator 35. They are connected to the DSECU 10. In some embodiments, at least one of them may be connected to another ECU. In such a configuration, the DSECU 10 receives signals from that via the other ECU, and/or transmits signals (a drive signal, an instruction signal, and the like) to that via the other ECU.

The invalid switch 21 is a switch which a driver of the vehicle operates in order to prohibit (invalidate) or allow (permit) an execution of "a driving force decrease control which will be described later". In other words, the driver operates the invalid switch 21 when the driver prohibits the DSECU 10 from performing the driving force decrease control or when the driver allows the DSECU 10 to perform the driving force decrease control. The invalid switch 21 outputs/generates a high-level signal (an operation signal) while the driver is pressing the invalid switch 21, and outputs/generates a low-level signal (a non-operation signal) while the driver is not pressing the invalid switch 21. As described later, the driving force decrease control is made invalid (i.e., prohibited) when the driver presses the invalid switch 21 (in other words, the high-level signal starts to be generated) in a situation where the driving force decrease control is valid (i.e., allowed to be performed). On the other hand, the driving force decrease control is made valid when the driver presses the invalid switch 21 (in other words, the high-level signal starts to be generated) in a situation where the driving force decrease control is invalid.

The acceleration position sensor 22 detects an acceleration pedal operation amount (a stepping amount) AP of an acceleration pedal (accelerator) 22a of the vehicle to output/generate a signal indicative of the acceleration pedal operation amount AP. The driver operates the acceleration pedal 22a when the driver wants to increase a driving force generated by a drive device (an internal combustion engine in this embodiment) 40. The acceleration pedal operation amount AP may be referred to as an "acceleration operation amount", and the acceleration pedal 22a may be referred to as an "acceleration operation member". The operation of stepping the acceleration pedal 22a may be referred to as an "acceleration operation". When the driver performs no acceleration operation (in other words, when the driver releases the acceleration pedal 22a), the acceleration pedal operation amount AP becomes "0". As the stepping amount of the acceleration pedal 22a becomes greater, the acceleration pedal operation amount AP becomes greater. Accordingly, the acceleration pedal operation amount AP is equal to or greater than "0".

The brake position sensor 23 detects a brake pedal operation amount (a stepping amount) BP of a brake pedal 23a of the vehicle to output/generate a signal indicative of the brake pedal operation amount BP. The driver operates the brake pedal 23a when the driver wants to increase a braking force generated by a brake device (a hydraulic friction brake device in this embodiment) 50. The brake pedal operation amount BP may be referred to as a "brake operation amount" or a "deceleration operation amount", and the brake pedal 23a may be referred to as a "brake operation member". When the driver performs no brake operation (in other words, when the driver releases the brake pedal 23a), the brake pedal operation amount BP becomes "0". As the stepping amount of the brake pedal 23a becomes greater, the brake pedal operation amount BP becomes greater. Accordingly, the brake pedal operation amount BP is equal to or greater than "0".

The shift position sensor 24 detects a position (hereinafter referred to as a "shift position SP") of a shift lever (a gear shift lever) (not shown) which is operated by the driver to output/generate a signal indicative of the detected shift position SP. The shift position SP is any one of a position corresponding to a parking range "P", a position corresponding to a drive range "D", a position (a reverse position R) corresponding to a reverse range "R", a position corresponding to a neutral range "N", and the like.

Each of the wheel speed sensors 25 is provided in the corresponding one of wheels of the vehicle. Each of the wheel speed sensors 25 generates one pulse signal (one wheel pulse signal) when the corresponding one of the wheels rotates by a predetermined angle. The DSECU 10 counts the number of the pulse signals transmitted from the corresponding one of the wheel speed sensors 25 for/within a predetermined time to calculate a rotation speed (a wheel speed) of each of the wheels based on the number of the pulse signals. The DSECU 10 calculates a vehicle speed Vs indicative of a speed of the vehicle based on the wheel speed of each of the wheels. For example, the vehicle speed Vs is an average value of the wheel speeds of the four wheels.

The gradient sensor 26 outputs/generates a signal indicative of a gradient angle of the vehicle in a longitudinal direction of the vehicle. The gradient sensor 26 will be described later in more detail when a second modification example is described later.

The throttle motor 31 receives a valve adjustment signal from the DSECU 10 and subsequently adjusts an opening degree of a throttle valve 41 of the internal combustion engine 40 based on the received valve adjustment signal. The valve adjustment signal represents a target opening degree of the throttle valve 41. As the acceleration pedal operation amount AP becomes greater, the target opening degree becomes greater. The throttle motor 31 rotates the throttle valve 41 such that the opening degree of the throttle valve 41 coincides with the target opening degree represented by the valve adjustment signal. As the target opening degree is greater, the opening degree of the throttle valve 41 is greater. Therefore, as the target opening degree is greater, an intake amount (an intake air amount) of "air which is taken into the internal combustion engine 40" is greater. Because of this, as the acceleration pedal operation amount AP becomes greater, torque generated by the internal combustion engine 40 (in other words, the driving force of the vehicle) becomes greater. The throttle motor 31 is one of driving force actuators for adjusting (changing) the driving force generated by the internal combustion engine 40.

The display 32 is a "Head Up Display" (hereinafter referred to as a "HUD") which receives display signal from DSECU 10, and displays information expressed by the received display signal on a partial area (a display area) of a front glass of the vehicle. In some embodiments, the display 32 may be a liquid-crystal display.

When the speaker 33 receives, from the DSECU 10, a producing signal which is a request for producing an alert sound, the speaker 33 produces the alert sound in response to the received producing signal.

The brake actuator 34 is provided in a hydraulic circuit (not shown) between "an master cylinder (not shown) which pressurizes working oil by using a pressing (depressing) force applied to the brake pedal 23a" and "a brake device 50 which comprises friction brake mechanisms and which is provided in each of the wheels". The DSECU 10 can control the brake force generated by the brake device 50 by controlling the brake actuator 34. The driver can increase the brake force generated by the brake device 50 by increasing the brake pedal operation amount BP.

The transmission actuator 35 changes a transmission gear of a transmission 60 of the vehicle. The DSECU 10 determines the transmission gear based on the shift position SP, the acceleration pedal operation amount AP, and the vehicle speed Vs. Subsequently, the DSECU 10 transmits a drive signal to the transmission actuator 35 so that the transmission actuator 35 changes the transmission gear to the determined transmission gear. For example, when the shift position SP becomes the reverse position R (the position corresponding to the reverse range "R"), the DSECU 10 and the transmission actuator 35 change the transmission gear of the transmission 60 to a transmission gear for driving the vehicle backward.

<Outline of Operation>

An operation of the present support device is described with reference to FIG. 2.

When the driver intends to drive the parked vehicle forward, the driver changes the shift lever position from the position corresponding to the parking range "P" to the position corresponding to the drive range "D" with stepping on the brake pedal 23a. Subsequently, the driver steps on the acceleration pedal 22a relatively greatly and quickly. However, at this moment, there is a case where the shift lever position has incorrectly/mistakenly been set to the position corresponding to the reverse range "R".

When the driver intends to driver the parked vehicle backward, the driver changes the shift lever position from the position corresponding to the parking range "P" to the position corresponding to the reverse range "R" with stepping on the brake pedal 23a. In this case, the driver typically drives the vehicle backward slowly by operating the brake pedal 23a, or by stepping on the acceleration pedal 22a slightly after releasing the brake pedal 23a. In other words, it is unlikely that the driver steps on the acceleration pedal 22a relatively greatly and quickly within a comparatively short time from a time point (a shift position changing time point) at which the driver changes the shift position to the position corresponding to the reverse range "R". Conversely, it can be said that, if the driver steps on the acceleration pedal 22a relatively greatly and quickly right after the shift position changing time point, this operation of the acceleration pedal 22a is likely to be a mistaken operation.

In view of the above, when the driver steps on the acceleration pedal 22a relatively greatly and quickly in a time period from "a time point t1 (the shift position changing time point) at which the driver changes the shift lever position to the position corresponding to the reverse range "R"" to "a time point t2 at which a first threshold time T1th elapses from the shift position changing time point t1", the present support device determines that the operation of the acceleration pedal 22a" is a mistaken acceleration operation. When this determination is made, the present support device controls the drive device 40 in such a manner that the driving force does not become excessive.

However, the driver may perform the mistaken acceleration operation even after the time point t2. The present inventor(s) have found that such a mistaken acceleration operation after the time point t2 is likely to occur, when the driver mistakenly steps on the acceleration pedal 22a in place of brake pedal 23a, in spite of the driver's intention of stepping on the brake pedal 23a again after releasing the brake pedal 23a.

In view of the above, the present support device is configured to determine that the driver has performed the mistaken acceleration operation when a mistaken acceleration operation condition described below becomes satisfied while the shift lever position is set at the position corresponding to the reverse range "R".

<Mistaken Acceleration Operation Condition (Mistaken Acceleration Operation Condition after a Braking-Off Time Point)>

A time (time length) from "a time point t3 at which the driver releases the brake pedal 23a (the driver finishes stepping on the brake pedal 23a)" to "a time point t4 at which an index value which varies/changes in response to the acceleration operation amount AP satisfies a predetermined index value condition (a sudden acceleration operation condition) described later" is equal to or shorter than a second threshold time T2th.

This mistaken acceleration operation condition may be referred to as a second mistaken acceleration operation condition, for convenience.

The time point t3 at which the driver releases the brake pedal 23a may be referred to as a "braking-off time point". The time point t4 at which the predetermined index value condition (the sudden acceleration operation condition) becomes satisfied may be referred to as a "condition satisfied time point". The time from the braking-off time point t3 to the condition satisfied time point t4 may be referred to as a "satisfied time".

The braking-off time point t3 is a time point at which the brake pedal operation amount BP detected by the brake position sensor 23 becomes "0" from a value greater than "0". In some embodiments, the present support device may comprise a brake switch connected to the DSECU 10. In this configuration, the DSECU 10 determines that the braking-off time point is a time point at which a signal from the brake switch changes from a high level signal (an ON signal) to a low level signal (an OFF signal). The brake switch outputs/generates the high level signal "when the driver operates (steps on) the brake pedal 23a so that the brake device 50 generate the brake force", and outputs/generates the low level signal when the driver does not operate (does not step on, or releases) the brake pedal 23a substantially (when the brake device 50 generates no brake force).

The present support device determines that the index value condition (the sudden acceleration operation condition) is satisfied when both conditions A1 and A2 described below are satisfied.

Condition A1: The acceleration pedal operation amount AP is equal to or greater than a predetermined threshold operation amount APth.

Condition A2: An acceleration operation speed APV (=dAP/dt) indicative of a change amount (an increase amount) of the acceleration pedal operation amount AP per a unit time is equal to or higher than a predetermined threshold speed APVth.

In this case, each of the acceleration pedal operation amount AP and the acceleration pedal operation speed APV corresponds to the index value which changes in response to the acceleration operation amount AP.

Figure 2:
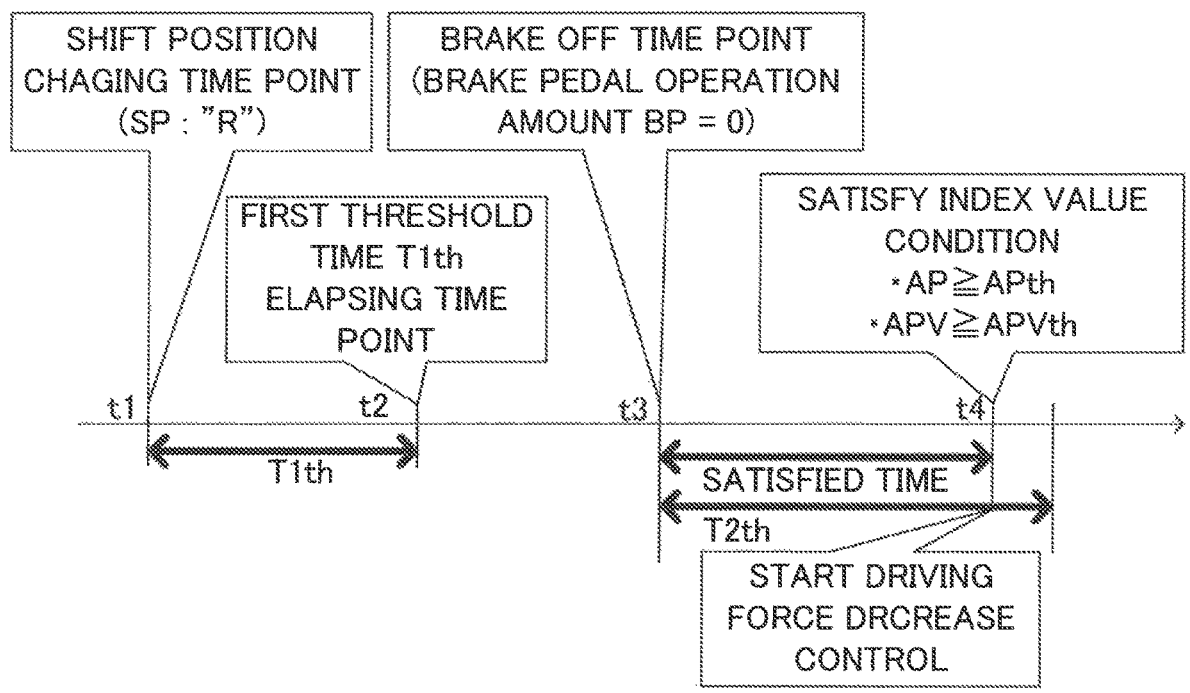
FIG. 2 is a diagram for describing an operation outline of the present support device.

In an example illustrated in FIG. 2, the above-described satisfied time from the time point t3 to the time point t4 is equal to or shorter than the second threshold time T2th. In this case, the mistaken acceleration operation condition is satisfied at the time point t4. Therefore, the present support device determines that the driver has performed the mistaken acceleration operation at the time point t4, and subsequently controls the drive device 40 to make "the driving force while the driver performs the mistaken acceleration operation" smaller than "the driving force while the driver performs no mistaken acceleration operation". In other words, the present support device performs a driving force decrease control when the present support device determines that the driver has performed the mistaken acceleration operation. More specifically, when the present support device determines that the driver has performed the mistaken acceleration operation, the present support device sets "the target opening degree of the throttle valve 41 in response to the acceleration pedal operation amount AP" to a smaller value than "the target opening degree when the present support device determines that the driver performs no mistaken acceleration operation". As a result, the present support device can decrease the driving force generated by the drive device 40.

As understood from the above, the present support device can detect the mistaken acceleration operation performed after the time point t2 so as to decrease the driving force generated by the drive device 40 when the driver performs that mistaken acceleration operation. As a result, the present support device can prevent the vehicle from accelerating backward suddenly when the driver performs the mistaken acceleration operation. In addition, the present support device determines that the driver has performed the mistaken acceleration operation when the satisfied time from the braking-off time point t3 to the condition satisfied time point t4 is equal to or shorter than the second threshold time T2th. Therefore, the present support device can detect certainly the mistaken acceleration operation which the driver may perform after finishing the operation of the brake pedal 23a.

<Specific Operation>

Figure 3:
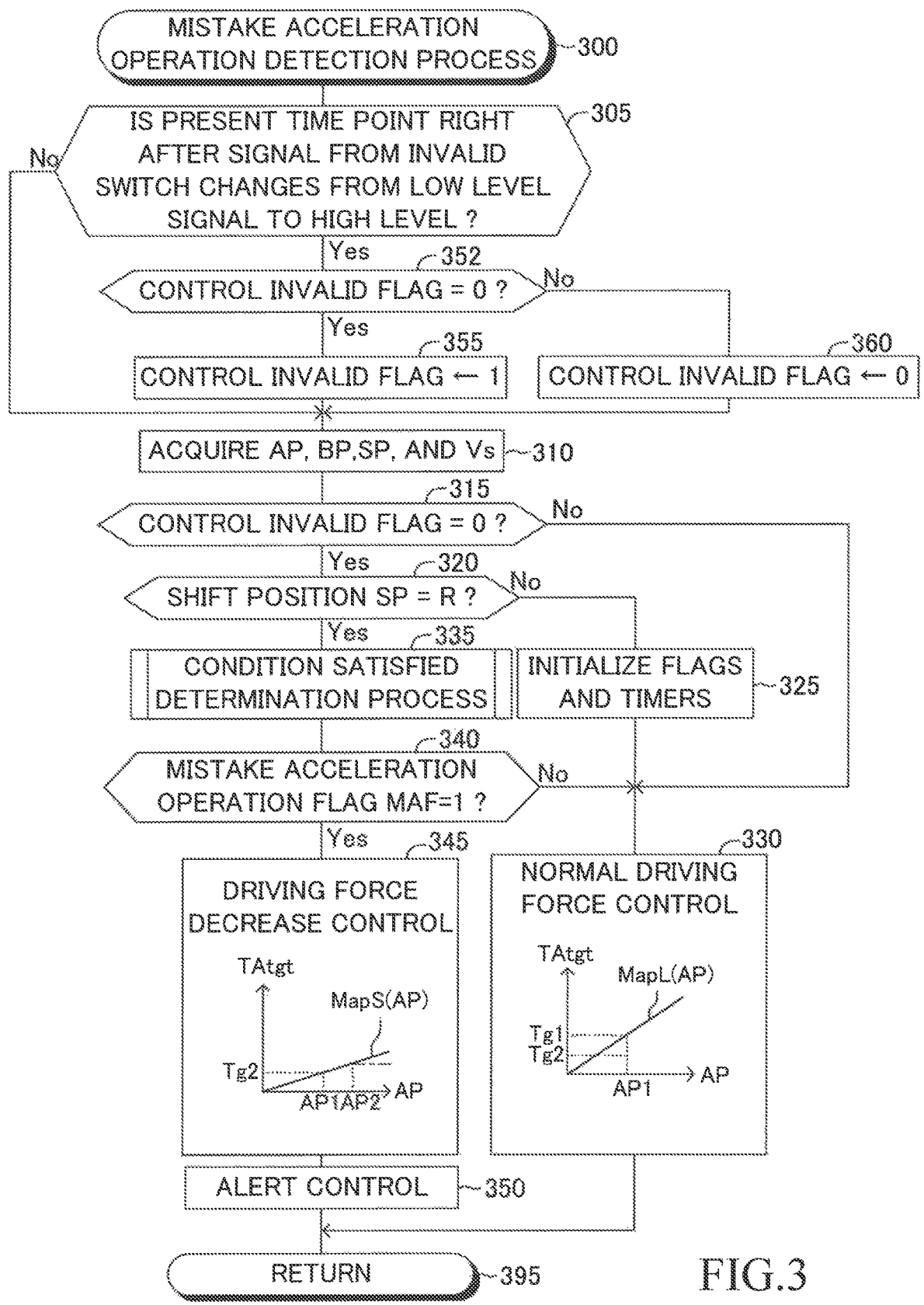
FIG. 3 is a flowchart illustrating a routine executed by a CPU of a driving support ECU illustrated in FIG. 1.

The CPU of the DSECU 10 executes a routine represented by a flowchart shown in FIG. 3, every time a predetermined time period elapses.

When a predetermined timing has come, the CPU starts processes from Step 300 illustrated in FIG. 3, and proceeds to Step 305 to determine whether or not the present time point is right after the signal from the invalid switch 21 changes from the low level signal (the non-operation signal) to the high level signal (the operation signal).

When the present time point is not right after the signal from the invalid switch 21 becomes the high level signal, the CPU makes a "No" determination at Step 305 to proceed to Step 310. At Step 310, the CPU acquires the acceleration pedal operation amount AP from the acceleration position sensor 22, acquires the brake pedal operation amount BP from the brake position sensor 23, and acquires the shift position SP from the shift position sensor 24. Furthermore, at Step 310, the CPU acquires (calculates) the vehicle speed Vs of the vehicle based on the wheel pulse signals from the wheel speed sensors 25.

Subsequently, the CPU proceeds to Step 315 to determine whether or not a control invalid flag is "0". The control invalid flag is set to "0" through an initialization routine which the CPU performs when an ignition key switch (not shown) is changed from an off position to an on position. When the control invalid flag is assumed to be "0", the CPU makes a "Yes" determination at Step 315, and proceeds to Step 320.

At Step 320, the CPU determines whether or not the shift position SP is the reverse position R (the position corresponding to the reverse range "R"). When the shift position SP is not the reverse position R, the CPU makes a "No" determination at Step 320 to proceed to Step 325. At Step 325, the CPU sets a reverse flag RVF, a brake release flag BRF, and a mistaken acceleration operation flag MAF to "0", and sets a first timer TMR1 and a second timer TMR2 to "0".

Subsequently, the CPU proceeds to Step 330 to perform a normal driving force control. More specifically, at Step 330, the CPU applies the acceleration operation amount AP to a look up table MapL(AP) to determine the target opening degree TAtgt of the throttle valve 41. According to this table MapL(AP), the target opening degree TAtgt is set to a value Tg1 when the acceleration pedal operation amount AP is a certain value AP1, and the target opening degree TAtgt is determined such that the target opening degree TAtgt becomes greater as the acceleration pedal operation amount AP becomes greater.

Furthermore, at Step 330, the CPU transmits, to the throttle motor 31, the valve adjustment signal including information indicative of the target opening degree TAtgt. As a result, the opening degree of the throttle valve 41 coincides with (becomes equal to) the target opening degree TAtgt. Accordingly, the internal combustion engine 40 generates the driving force corresponding to the opening degree of the throttle valve 41. Subsequently, the CPU proceeds to Step 395 to terminate the present routine tentatively.

Figure 4:
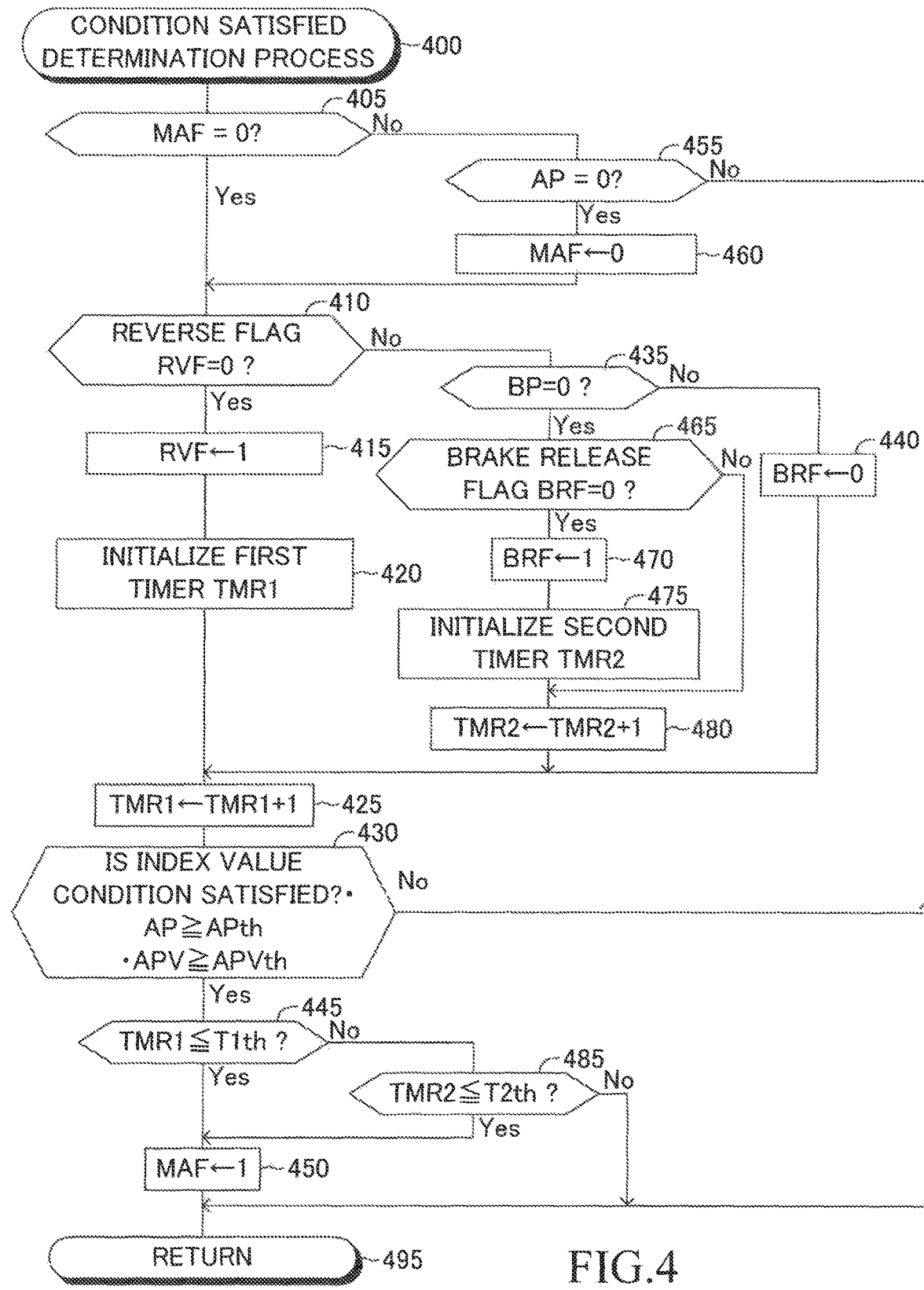
FIG. 4 is a flowchart illustrating a routine executed by the CPU at a condition satisfied determination process of the routine illustrated in FIG. 3.

On the other hand, when the shift position SP is the reverse position R at a time point at which the CPU executes the process of Step 320, the CPU makes a "Yes" determination at Step 320, and proceeds to Step 335 to execute a condition satisfied determination process. Specifically, when the CPU proceeds to Step 335, the CPU executes a subroutine illustrated in FIG. 4 described later. When the CPU determines that the driver has performed the mistaken acceleration operation through the condition satisfied determination process, the CPU sets the mistaken acceleration operation flag MAF to "1". The mistaken acceleration operation flag MAF and the other flags are set to "0" through the above-described initialization routine.

Subsequently, the CPU proceeds to Step 340, the CPU determines whether or not the mistaken acceleration operation flag MAF is "1". When the CPU determines that the driver has performed no mistaken acceleration operation, the mistaken acceleration operation flag is set to "0". In this case, the CPU makes a "No" determination at Step 340, and proceeds to Step 330 to perform the above described normal driving force control. Consequently, the CPU does not perform both the driving force decrease control (Step 345 described later) and "an alert control (Step 350 described later) for alerting the driver to the mistaken acceleration operation".

On the other hand, when the mistaken acceleration operation flag MAF is set to "1" through the condition satisfied determination process executed at Step 335, the CPU makes a "Yes" determination at Step 340 at Step 340. Subsequently, the CPU performs Steps 345 and Step 350 described below in this order, and proceeds to Step 395 to terminate the present routine tentatively.

Step 345: The CPU performs the driving force decrease control. More specifically, the CPU applies the acceleration pedal operation amount AP to a look up table MapS(AP) to determine the target opening degree TAtgt of the throttle valve 41.

According to this table MapS(AP), the target opening degree TAtgt is set to a value Tg2 smaller than the value Tg1 when the the acceleration pedal operation amount AP is the value AP1, and the target opening degree TAtgt is determined such that the target opening degree TAtgt becomes greater as the acceleration pedal operation amount AP becomes greater. In other words, the target opening TAtgt which is set based on the table MapS(AP) is smaller than the target opening TAtgt which is set based on the table MapL (AP), when the acceleration pedal operation amount AP is a certain value. In some embodiments, the table MapS(AP) may be designed in such a manner that the target opening degree TAtgt maintains a constant value when the acceleration pedal operation amount AP is equal to or greater than a predetermined operation amount AP2 (referring to a dashed line in a block of Step 345 illustrated in FIG. 3).

Further, at Step 345, the CPU transmits, to the throttle motor 31, the valve adjustment signal including information indicative of the target opening degree TAtgt which is set based on the table MapS(AP). As a result, the opening degree of the throttle valve 41 coincides with (becomes equal to) the target opening valve TAtgt so that the internal combustion engine 40 generates the driving force corresponding to the opening degree of the throttle valve 41. Thereafter, the CPU proceeds to Step 395 to terminate the present routine tentatively.

Accordingly, assuming that the acceleration operation amount AP is the certain value, "the driving force which the internal combustion engine 40 generates when the driving force decrease control is being performed" becomes smaller than "the driving force which the internal combustion engine 40 generates when the normal driving force control is not being performed".

Step 350: The CPU performs the alert control. In more detail, the CPU transmits, to the display 32, the display signal for displaying an alert screen to urge/prompt the driver to release the acceleration pedal 22a. Furthermore, the CPU transmits, to the speaker 33, the producing signal for producing the alert sound in order to alert (warn) the driver to (of) the mistaken acceleration operation.

When the control invalid flag is "1" at a time point at which the CPU executes the process of Step 315, the CPU makes a "No" determination at Step 315, and proceeds to Step 330 directly. Therefore, when the control invalid flag is "1", the CPU does not perform the driving force decrease control (Step 345) but performs the normal driving force control (Step 350). In other words, the CPU prohibits itself from performing the driving force decrease control (the CPU invalidates the driving force decrease control, or prohibits the driving force decrease control from being performed).

On the other hand, when the time point at which the CPU proceeds to Step 305 is right after the signal from the invalid switch 21 has changed to the high level signal, the CPU makes a "Yes" determination at Step 305, and proceeds to Step 352 to determine whether or not the control invalid flag is "0".

When the control invalid flag is "0", the CPU makes a "Yes" determination at Step 352, and proceeds to Step 355 to set the control invalid flag to "1". In this case, the CPU makes a "No" determination at Step 315, and proceeds to Step 330. Therefore, the CPU does not perform the driving force decrease control.

On the other hand, when the control invalid flag is "1" at the time point at which the CPU executes the process of Step 352, the CPU makes a "No" determination at Step 352, and proceeds to Step 360 to set the control invalid flag to "0". In this case, the CPU makes a "Yes" determination at Step 315. Therefore, when the mistaken acceleration operation flag MAF is "1", the CPU proceeds to Step 345 to perform the driving force decrease control.

Next, the condition satisfied determination process which the CPU performs at Step 335 is described. As described above, when the CPU proceeds to Step 335, the CPU starts processes from Step 400 illustrated in FIG. 4, and proceeds to Step 405 to determine whether or not the mistaken acceleration operation flag MAF is "0".

When the mistaken acceleration operation flag MAF is "0", the CPU makes a "Yes" determination at Step 405, and proceeds to Step 410 to determine whether or not a reverse flag RVF is "0". The reverse flag is set to "0" when the shift position SP is any one of ranges other than the reverse range "R" (referring to Step 325).

The CPU makes a "Yes" determination at Step 410 when the reverse flag RVF is "0", and execute processes of Step 415 to Step 425 described below in this order. Thereafter, the CPU proceeds to Step 430.

Step 415: The CPU sets the reverse flag RVF to "1". The case where the CPU determines that the reverse flag RVF is "0" at Step 410 means that the shift position SP has been determined to be the position corresponding to one of the ranges except the reverse range "R" until the CPU performs the routine illustrated in FIG. 3 (more specifically, the process of Step 320) at the present time point. On the other hand, the CPU proceeds to the Step 410 when the CPU determines that the shift position SP is the position corresponding to the reverse range "R" at Step 320 illustrated in FIG. 3. In view of the above, at Step 410, the CPU sets the reverse flag RVF to "1". Therefore, "the time point at which the reverse flag RVF is changed from "0" to "1"" means the shift position changing time point described above (i.e. the time point at which the shift lever has been changed to the reverse range "R").

Step 420: The CPU sets the first timer TMR1 to "0" to initialize the first timer TMR1. The first timer TMR1 is a timer for counting/measuring an elapsed time (time length) from the shift position changing time point.

Step 425: The CPU increments the first timer TMR1 by "1".

Step 430: The CPU determines whether or not the index values (i.e. the acceleration pedal operation amount AP and the acceleration pedal operation speed APV) which change in response to the acceleration pedal operation amount AP satisfy the index value condition (the sudden acceleration operation condition).

It should be noted that the CPU calculates the acceleration pedal operation speed APV as follows. That is, the CPU divides "a value which is acquired by subtracting a previous acceleration pedal operation amount AP from a present acceleration pedal operation amount AP" by a predetermined time (interval) ΔT. The CPU executes the routine illustrated in FIG. 3 every time the time ΔT elapses. The CPU acquires the divided value as the acceleration pedal operation speed APV. The previous acceleration pedal operation amount AP was acquired at Step 310 through the routine which was performed at a previous time point before a predetermined time ΔT from the present time point. The present acceleration pedal operation amount AP is acquired at Step 310 through the routine which is performed at the present time point.

When the index values do not satisfy the index value condition, the CPU makes a "No" determination at Step 430, and proceeds to Step 495 directly, and thereafter, proceeds to Step 340 shown in FIG. 3. In this case, the CPU determines, though the condition satisfied determination process, that the driver has performed no mistaken acceleration operation, because the index values do not satisfy the index value condition. As a result, the mistaken acceleration operation flag MAF remains "0".

Now, it is assumed that the invalid switch 21 is not operated and the shift position SP is maintained at the position corresponding to the reverse range "R". In this case, when the CPU starts the routine illustrated in FIG. 3 again, the CPU makes a "Yes" determination at Step 315, makes a "Yes" determination at Step 320, and makes a "Yes" determination at Step 405 illustrated in FIG. 4 to proceed to Step 410. At this time point, the reverse flag RVF is "1". Therefore, the CPU makes a "No" determination at Step 410, and proceeds to Step 435 to determine whether or not the brake pedal operation amount BP is "0".

When the brake pedal operation amount BP is greater than "0", the driver is stepping on the brake pedal 23a. In other words, the driver is performing the brake operation. In this case, the CPU makes a "No" determination at Step 435, and proceeds to Step 440 to set the brake release flag BRF to "0". In this manner, when the brake pedal operation amount BP is greater than "0" (in other words, when the driver steps on the brake pedal 23a to perform the brake operation), the brake release flag BRF is set to "0". Subsequently, the CPU proceeds to Step 425.

Further, it is assumed that the driver finishes performing the brake operation so that the brake pedal operation amount BP becomes "0" before the CPU performs the Step 435. In this case, when the CPU proceeds to Step 435, the CPU makes a "Yes" determination at Step 435, and proceeds to Step 465 to determine whether or not the brake release flag BRF is "0". In this time point, the brake release flag BRF is "0". Therefore, the CPU makes a "Yes" determination at Step 465, and performs Step 470 through Step 480 in this order. Thereafter, the CPU proceeds to Step 425.

Step 470: The CPU sets the brake release flag BRF to "1".

Step 475: The CPU sets the second timer TMR2 to "0" to initialize the second timer TMR2. The second timer TMR2 is a timer for counting/measuring an elapsed time (time length) from the braking-off time point.

Step 480: The CPU increments the second timer TMR2 by "1".

If the brake pedal operation amount BP continues being "0", the CPU repeats making a "Yes" determination at Step 435. In this case, the brake release flag BRF has already been set to "1". Therefore, the CPU makes a "No" determination at Step 465, and proceeds to Step 480 directly. Subsequently, the CPU proceeds to Step 425.

As understood from the above, the first timer TMR1 is initialized at the shift position changing time point at which the shift lever is changed to the reverse range "R" (referring to Step 420). Thereafter, the first timer TMR1 is increased through the process of Step 425 as a time elapses, while (as long as) the shift position SP is maintained at the reverse position R. Furthermore, the second timer TMR2 is initialized at the braking-off time point (referring to Step 475) while the shift position SP is maintained at the reverse position R, and thereafter, is increased through the process of Step 480 as a time elapses, while (as long as) the brake pedal operation amount BP is maintained at "0".

It is further assumed that the index value condition (the sudden acceleration operation condition) becomes satisfied while the above processes are repeated. In this case, the CPU makes a "Yes" determination at Step 430, and proceeds to Step 445 to determine whether or not the first timer TMR1 at the present time point is equal to or smaller than the first threshold time T1th.

When the first timer TMR1 is equal to or smaller than the first threshold time T1th, in other words, when "the time (length) from the shift position changing time point to the condition satisfied time point at which the index value condition becomes satisfied" is equal to or shorter than the first threshold time T1th, the CPU determines that a first mistaken acceleration operation condition is satisfied. In this case, the CPU makes a "Yes" determination at Step 445, and proceeds to Step 450 to set the mistaken acceleration operation flag MAF to "1". Subsequently, the CPU proceeds to Step 340 illustrated in FIG. 3 via Step 495. As a result, the CPU executes the process of Step 345 to perform the driving force decrease control.

In contrast, when the time (length) from the shift position changing time point to the condition satisfied time point at which the index value condition becomes satisfied is longer than the first threshold time T1th, the CPU makes a "No" determination at Step 445, and proceeds to Step 485. At Step 485, the CPU determines whether or not the second timer TMR2 is equal to or smaller than the second threshold time T2th.

When the second timer TMR2 is equal to or smaller than the second threshold time T2th, in other words, when the time (length) from the braking-off time point to the condition satisfied time point at which the index value condition becomes satisfied is equal to or shorter than the second threshold time T2th, the CPU determines that the (second) mistaken acceleration operation condition is satisfied. In this case, the CPU makes a "Yes" determination at Step 485, and proceeds to Step 450 to set the mistaken acceleration operation flag MAF to "1". Subsequently, the CPU proceeds to Step 340 illustrated in FIG. 3 via Step 495. As a result, the CPU performs Step 345 to perform the driving force decrease control.

When the CPU proceeds to Step 405 after the CPU sets the mistaken acceleration operation flag MAF to "1" at Step 450, the CPU makes a "No" determination at Step 405, and proceeds to Step 455.

At Step 455, the CPU determines whether or not the acceleration pedal operation amount AP is "0", in other words, the CPU determines whether or not the driver finishes stepping on the acceleration pedal 22a. When the acceleration pedal operation amount AP is greater than "0", the driver continues performing the mistaken acceleration operation. In this case, the CPU makes a "No" determination at Step 455, and proceeds to Step 495 directly. In this case, the mistaken acceleration operation flag MAF is maintained at "1".

In contrast, when the driver notices the mistaken acceleration operation to release the acceleration pedal 22a, the acceleration pedal operation amount AP becomes "0". In this case, when the CPU proceeds to Step 455, the CPU makes a "Yes" determination at Step 455, proceeds to Step 460 to set the mistaken acceleration operation flag MAF to "0", and proceeds to Step 410. As a result, the CPU does not perform the driving force decrease control, unless the CPU executes the process of Step 450 again.

As described above, even after the first threshold time T1th has elapsed from the shift position changing time point, the present support device determines that the driver has performed the mistaken acceleration operation and performs the driving force decrease control, when the time from the braking-off time point to the condition satisfied time point is equal to or shorter than the second threshold time T2th. Therefore, the present support device can detect certainly the mistaken acceleration operation performed after the first threshold time T1th elapses from the shift position changing time point, and can prevent the vehicle from accelerating suddenly due to this mistaken acceleration operation.

Modification Example

When the vehicle is located on a slope which the vehicle goes up when the vehicle backs/reverses (hereinafter, referred to as a "reverse ascent slope"), this modification example sets the first threshold time T1th to a slope first threshold time ST1th shorter than "a normal first threshold time UT1th when the vehicle is not located on the reverse ascent slope". Furthermore, when the vehicle is located on the reverse ascent slope, the present support device sets the second threshold time T2th to a slope second threshold time ST2th shorter than "a normal second threshold time UT2th when the vehicle is not located on the reverse ascent slope".

Figure 5:
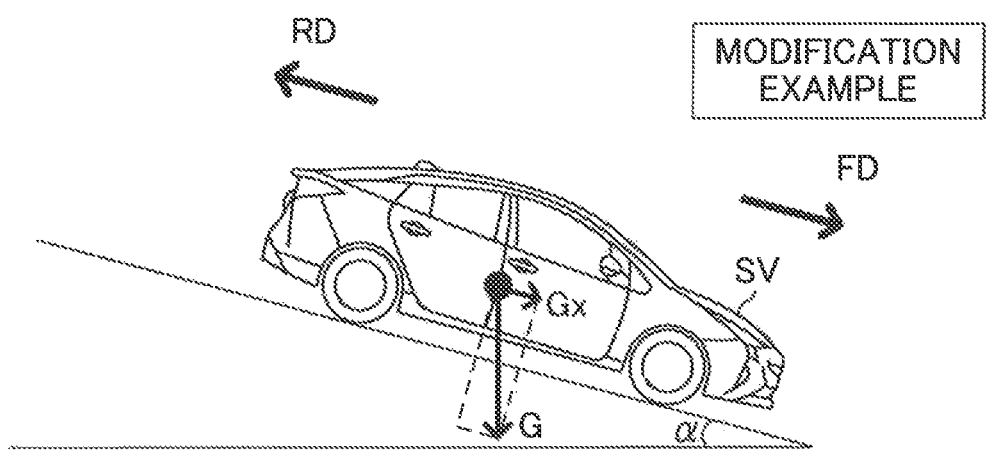
FIG. 5 is a diagram for describing the gravitational acceleration applied to a vehicle located on a reverse ascent slope.
Figure 6:
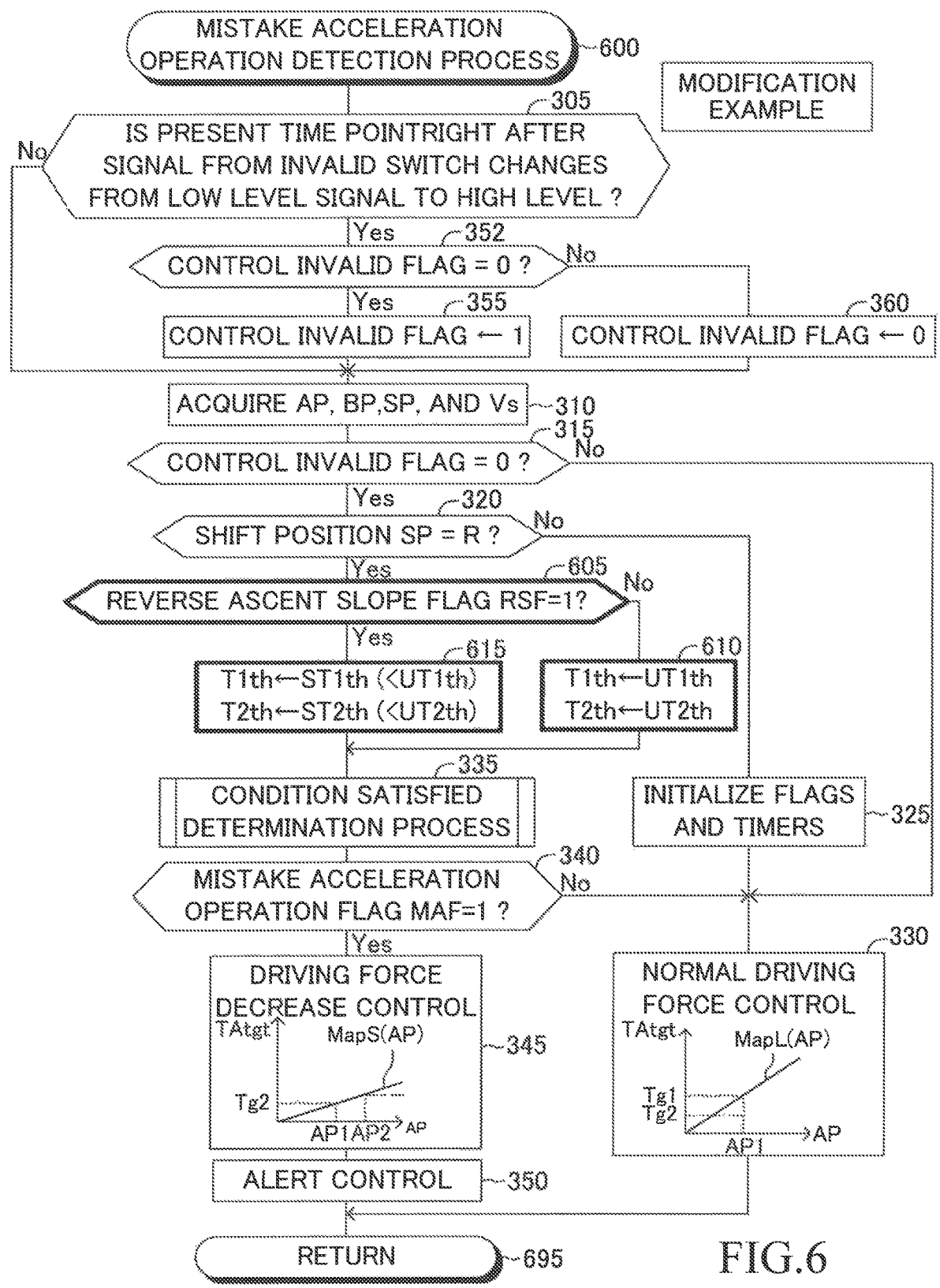
FIG. 6 is a flowchart illustrating a routine executed by the CPU of driving support ECU according to a modification example of the present support device.

As illustrated in FIG. 5, a vehicle longitudinal direction component Gx of the gravitational acceleration G is applied in a forward direction FD of the vehicle SV on the reverse ascent slope. This vehicle longitudinal direction component Gx is applied to the vehicle in a direction opposite to a backward direction RD which is a direction in which the vehicle backs/reverses so that the vehicle is going to move forward (in other words, the vehicle is going to descend the slope). Therefore, when the driver intends to drive the vehicle backward after the driver changes the shift lever to the reverse range "R", "the timing at which the driver steps on the acceleration pedal 22a (performs the acceleration operation) to prevent the vehicle from moving forward after the shift position changing time point or the braking-off time point" becomes earlier than usual.

If the first threshold time T1th is set to be equal to the normal first threshold time UT1th and the second threshold time T2th is set to be equal to the normal second threshold time UT2th, the intentional acceleration operation for preventing the vehicle from moving forward may incorrectly be determined as the mistaken acceleration operation when the vehicle is located on the reverse ascent slope.

In view of the above, this modification example sets the first threshold time T1th to the slope first threshold time ST1th shorter than the normal first threshold time UT1th, and sets the second threshold time T2th to the slope second threshold time ST2th shorter than the normal second threshold time UT2th, when the vehicle is located on the reverse ascent slope. Therefore, this modification example can decrease an occurrence frequency of a situation where the intentional acceleration operation when the vehicle is located on the reverse ascent slope is determined as the mistaken acceleration operation. Therefore, this modification example can decrease the probability that the driving force decrease control is performed while the driver is performing the intentional acceleration operation. Accordingly, this modification example can decrease an occurrence frequency of a situation where the driving force decrease control annoys the driver.

Firstly, how the gradient angle is detected using the gradient sensor 26 is described. The gradient sensor 26 is an acceleration sensor (not shown) for detecting acceleration in a longitudinal direction of the vehicle SV. The gradient sensor 26 outputs/generates a positive value indicative of acceleration for increasing the vehicle speed Vs when the vehicle SV is driving forward, and a negative value indicative of acceleration for increasing the vehicle speed Vs when the vehicle SV is driving backward. The gradient sensor 26 detects not only the above described vehicle longitudinal direction component Gx of the gravitational acceleration G but also moving acceleration which is acceleration calculated based on change of the vehicle speed Vs. Therefore, "the acceleration which the gradient sensor 26 detects when the moving acceleration is not generated" represents only the vehicle longitudinal direction component Gx of the gravitational acceleration G.

As illustrated in FIG. 5, when the vehicle SV is located on the reverse ascent slope and the moving acceleration is not generated, the acceleration detected by the gradient sensor 26 represents only the vehicle longitudinal direction component Gx of the gravitational acceleration G, and this acceleration acts in the forward direction FD. When the vehicle SV is located on a flat ground instead of the slope and the moving acceleration is not generated, the acceleration detected by the gradient sensor 26 represents only the vehicle longitudinal direction component Gx of the gravitational acceleration G, and this acceleration does not act in any of the forward direction FD and the backward direction RD (in other words, magnitude of the vehicle longitudinal direction component Gx is "0"). If the acceleration (the vehicle longitudinal direction component Gx) detected by the gradient sensor 26 when the moving acceleration is not generated is the positive value, the DSECU 10 determines that the vehicle SV is located on the reverse ascent slope. Furthermore, the DSECU 10 applies the acceleration (the vehicle longitudinal direction component Gx) detected by the gradient sensor 26 when the moving acceleration is not generated to the following equation to detect a gradient angle α.

$$\alpha = \sin^{-1}(Gx/G)$$

Figure 7:
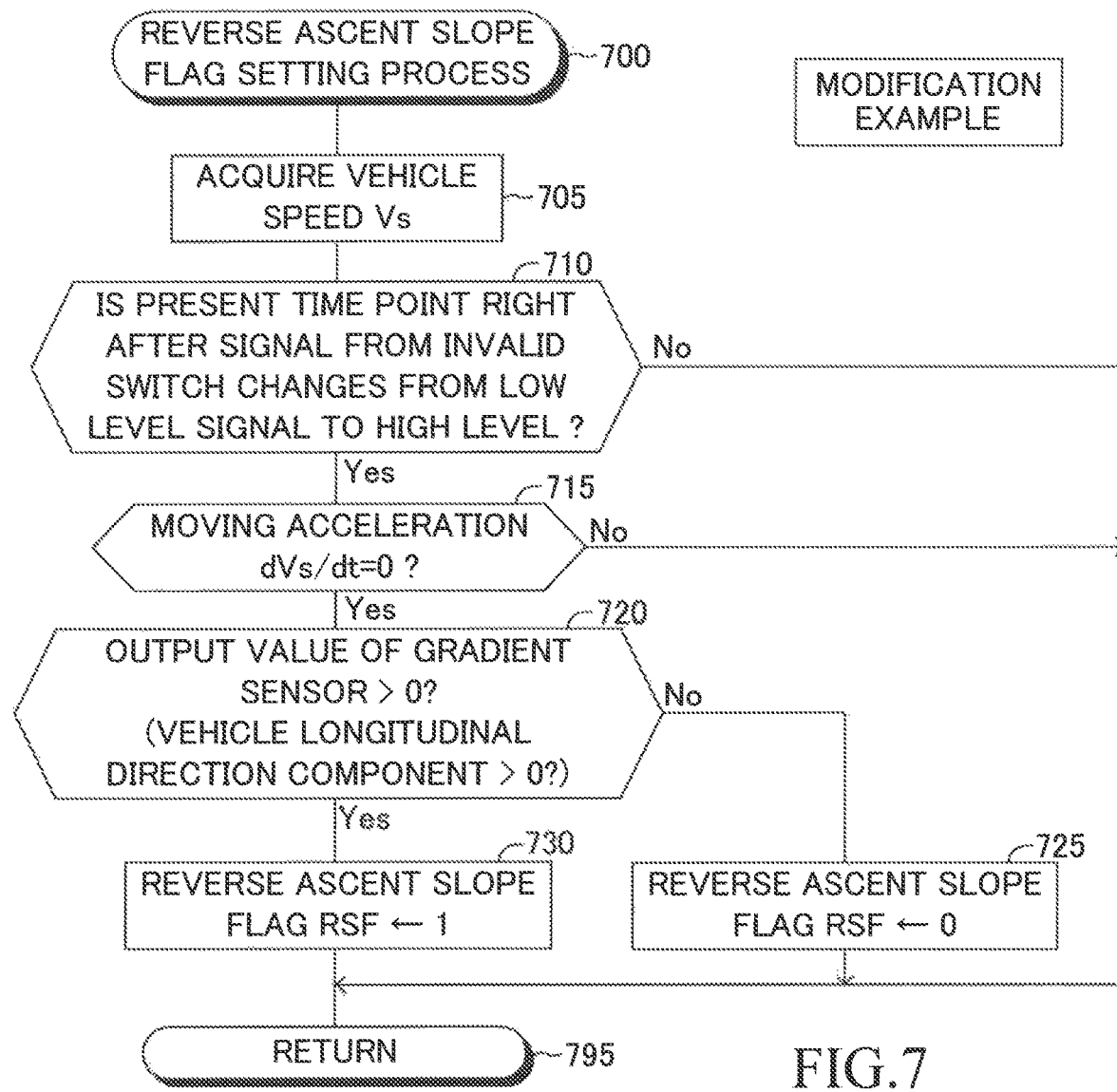
FIG. 7 is a flowchart illustrating another routine executed by the CPU of driving support ECU according to the modification example of the present support device.

The CPU of the DSECU 10 according to this modification example executes a routine represented by a flowchart shown in FIG. 7 in place of the routine represented by a flowchart shown in FIG. 3, every time a predetermined time period elapses. In FIG. 7, the same Steps as the Steps shown in FIG. 3 are denoted with common step symbols for the Steps shown in FIG. 3, and description thereof is omitted.

Here, it is assumed that a state continues in which the invalid switch 21 is not operated so that the control invalid flag remains "0", and that the shift position SP is maintained at the position corresponding to the reverse range "R". When a predetermined timing has come, the CPU starts processes from Step 600. The CPU makes a "No" determination at Step 305 because the invalid switch 31 is not operated. Subsequently, the CPU performs Step 310, and proceeds to Step 315. The CPU makes a "Yes" determination at Step 315 because the control invalid flag is "0", and proceeds to Step 320. The CPU makes a "Yes" determination at Step 320 because the shift position SP is at the position corresponding to the reverse range "R", and proceeds to Step 605.

At Step 605, the CPU determines whether or not a reverse ascent slope flag RSF is "1". The reverse ascent slope flag RSF is set to "1", when the CPU determines that the vehicle SV is located on the reverse ascent slope through a reverse ascent slope flag setting process described later. The reverse ascent slope flag RSF is set to "0", when the CPU determines that the vehicle SV is not located on the reverse ascent slope. The reverse ascent slope flag RSF is set to "0" though the initialization routine.

Assuming that the reverse ascent slope flag is "0", in other words, the vehicle is not located on the reverse ascent slope, the CPU makes a "No" determination at Step 605, and proceeds to Step 610. At Step 610, the CPU sets the first threshold time T1th to the normal first threshold time UT1th, and sets the second threshold time T2th to the normal second threshold time UT2th. Subsequently, the CPU performs the process of Step 335 and the processes after Step 335, and proceeds to Step 695 to terminate the present routine tentatively.

On the other hand, if the vehicle is located on the reverse ascent slope so that the reverse ascent slope flag RSF is set to "1" though the reverse ascent setting process at the time point at which the CPU performs Step 605, the CPU makes a "Yes" determination at Step 605. Thereafter, the CPU proceeds to Step 615. At Step 615, the CPU sets the first threshold time T1th to the slope first threshold time ST1th shorter than the normal first threshold time UT1th, and sets the second threshold time T2th to the slope second threshold time ST2th shorter than the normal second threshold time UT2th. Subsequently, the CPU performs the process of Step 335 and the processes after Step 335, and proceeds to Step 695 to tentatively terminate the present routine.

Here, the reverse ascent slope flag setting process is described. The reverse ascent slope flag setting process is a routine represented by a flowchart shown in FIG. 8. The CPU executes the reverse ascent slope flag setting process, every time a predetermined time elapses.

When a predetermined timing has come, the CPU starts processes from Step 700 illustrated in FIG. 7, and proceeds to Step 705 to acquire the vehicle speed Vs based on the wheel pulse signals from the wheel speed sensors 25. Subsequently, the CPU proceeds to Step 710 to determine whether or not the present time point (the time point at which the CPU executes the process of Step 710) is right after the shift position SP was changed to the reverse position R.

When the present time point (the time point at which the CPU performs Step 710) is not right after the shift position SP was changed to the reverse position R, the CPU makes a "No" determination at Step 710, and proceeds to Step 795 to tentatively terminate the present routine. As a result, the reverse ascent slope flag remains the same as the previous value.

On the other hand, when the present time point (the time point at which the CPU executes the process of Step 710) is right after the shift position SP was changed to the reverse position R, the CPU makes a "Yes" determination at Step 710, and proceeds to Step 715. At Step 715, the CPU determines whether or not the moving acceleration is "0". More specifically, the CPU divides "a value (dVs) which is acquired by subtracting a previous vehicle speed Vs from a present vehicle speed Vs" by a predetermined time dt, the routine illustrated in FIG. 7 being performed every time the time dt elapses. The CPU acquires the divided value as the moving acceleration. The previous vehicle speed Vs was acquired at Step 705 through the routine which was performed at a previous time point before the time dT from the present time point. The present vehicle speed Vs is acquired at Step 705 through the routine which is performed at the present time point. Subsequently, the CPU determined whether or not the calculated moving acceleration is "0".

Generally, the moving acceleration right after a time point at which the shift position SP was changed to the reverse position R is "0" in most cases, because the vehicle is not moving at that time point. Assuming, thus, that the moving acceleration is "0", the CPU makes a "Yes" determination at Step 715, and proceeds to Step 720 to determine whether or not an output value of the gradient sensor 26 is the positive value, in other words, whether or not the vehicle longitudinal direction component Gx is the positive value.

When the output value of the gradient sensor 26 is not the positive value, in other words, when the vehicle longitudinal direction component Gx is not the positive value, the CPU determined that the vehicle is not located on the reverse ascent slope. In this case, the CPU makes a "No" determination at Step 720, and proceeds to Step 725 to set the reverse ascent slope value RSF to "0". Subsequently, the CPU proceeds to Step 795 to terminate the present routine tentatively.

On the other hand, when the output value of the gradient sensor 26 is the positive value, in other words, when the vehicle longitudinal direction component Gx is the positive value, the CPU determines that the vehicle is located on the reverse ascent slope. In this case, the CPU makes a "Yes" determination at Step 720, and proceeds to Step 730 to set the reverse ascent slope value RSF to "1". Subsequently, the CPU proceeds to Step 795 to terminate the present routine tentatively.

On the other hand, when the moving acceleration is not "0" at the time point at which the CPU executes the process of Step 715, the CPU makes a "No" determination at Step 715, and proceeds to Step 795 to terminate the present routine tentatively. The acceleration detected by the gradient sensor 26 when the moving acceleration is not "0" includes the vehicle longitudinal direction component Gx and the moving acceleration. Therefore, the acceleration detected by the gradient sensor 26 does not represent only the vehicle longitudinal direction component Gx. Accordingly, the CPU cannot correctly determine whether or not the vehicle is located on the reverse ascent slope based on the output value of the gradient sensor 26 when the moving acceleration is not "0". Thus, when the moving acceleration is not "0", the CPU makes a "No" determination at Step 715, and proceeds to Step 795 directly without executing the process of Step 720 to terminate the present routine tentatively.

As described above, in the case where the vehicle is located on the reverse ascent slope, the driving force decrease control is performed, when the time from the shift position changing time point to the condition satisfied time point at which the index value condition is satisfied is equal to or shorter than the slope first threshold time ST1th, or when the time from the braking-off time point (i.e., no detection time point) to the condition satisfied time point is equal to or shorter than the slope second threshold time ST2th. Therefore, this modification example can decrease the possibility that the intentional acceleration operation when the vehicle is located on the reverse ascent slope is determined to be the mistaken acceleration operation. As a result, this modification example can decrease the possibility that the driving force decrease control is performed while the driver is performing the intentional acceleration operation. Accordingly, this modification example can decrease an occurrence frequency of a situation where the driving force decrease control annoys the driver.

In some embodiments, at Step 715, the CPU sets each of the slope first threshold time ST1th and the slope second threshold time ST2th to a smaller value, as the gradient angle α of the reverse ascent slope is greater. As the gradient angle α of the reverse ascent slope is greater, the magnitude of the vehicle longitudinal direction component Gx which is applied to the vehicle in the forward direction FD is greater. Therefore, the driver tends to perform the acceleration operation earlier (more quickly). In this embodiment, the CPU can set each of the slope first threshold time ST1th and the slope second threshold time ST2th to an appropriate value corresponding to such driver's tendency. Accordingly, this modification example can decrease more greatly the possibility that the intentional acceleration operation when the vehicle is located on the reverse ascent slope is determined as the mistaken acceleration operation.

The present invention is not limited to the above-described embodiment, and can adopt various modifications of the present invention.

In the above-described embodiment and the above-described modification example, the DSECU 10 performs the driving force decrease control by using the throttle motor 31 and throttle valve 41. In some embodiments, the DSECU 10 may perform the driving force decrease control by using at least one of other driving force actuators (for examples, a fuel injection valve, an ignition system, and the like) which can adjust the driving force of the vehicle which is generated by the internal combustion engine 40.

More specifically, the DSECU 10 decreases an injection amount of the fuel which is injected by the fuel injection valve when the DSECU 10 performs the driving force decrease control in comparison with the injection amount while the DSECU 10 does not perform the driving force decrease control. This can make the driving force generated by the internal combustion engine 40 smaller. Furthermore, in some embodiments, the DSECU 10 may delay the igniting timing at which the ignition system 40 (an ignition plug) ignites the fuel when the DSECU 10 performs the driving force decrease control in comparison with the igniting timing when the DSECU 10 does not perform the driving force decrease control. This can also make the driving force generated by the internal combustion engine 40 smaller.

Furthermore, the DSECU 10 may perform the following driving force decrease control. The DSECU 10 calculates a time derivative value of the vehicle speed Vs as the acceleration of the vehicle SV. When the DSECU 10 performs the driving force decrease control, the DSECU 10 controls the driving force actuator(s) such that the magnitude of the calculated acceleration of the vehicle SV does not exceed a predetermined upper limit value. More specifically, the DSECU 10 controls the driving force actuator(s) to decrease the driving force generated by the internal combustion engine 40 when the magnitude of the acceleration of the vehicle SV exceeds the predetermined upper limit value.

In some embodiments, the above-described table MapL (AP) may be a table MapL(AP, Vs) which further has the vehicle speed Vs as an argument (parameter), and the above-described table MapS(AP) may be a table MapS(AP, Vs) which further has the vehicle speed Vs as an argument. In this case, the target opening degree TAtgt is determined such that the target opening degree TAtgt becomes smaller, as the vehicle speed Vs becomes higher, based on the tables (MapL(AP, Vs), MapS(AP, Vs)). Further, these tables (MapL(AP, Vs), MapS(AP, Vs)) have been configured to satisfy the following condition, with respect to an arbitrary combination of an arbitrary acceleration pedal operation amount APn and an arbitrary vehicle speed Vsn.

$$MapS(APn, Vsn) < MapL(APn, Vsn)$$

The drive device 40 in the above-described embodiment and the above-described modification example is the internal combustion engine, however, the drive device 40 in some embodiments may be an electric motor. Furthermore, the drive device 40 may comprise the electric motor and the internal combustion engine in some embodiments. That is, this embodiment can be applied to an electric vehicle, a hybrid vehicle, or the like.

When the vehicle is the electric vehicle or the hybrid vehicle, a target driving torque of the vehicle is determined based on the acceleration pedal operation amount AP and the vehicle speed Vs, and the drive device is controlled such that a torque applied to each of the driving wheels becomes equal to the target driving force. The DSECU 10 installed in the electric vehicle or the hybrid vehicle makes the target driving torque corresponding the acceleration pedal operation amount AP and the vehicle speed Vs when the DSECU 10 performs the driving force decrease control lower than the target driving torque when the DSECU 10 does not perform the driving force decrease control.

The acceleration operation member is not limited to the acceleration pedal 22a. In some embodiments, the acceleration operation member may be an acceleration lever. Similarly, the brake operation member is not limited to the brake pedal 23a. In some embodiments, the brake operation member may be a brake lever.

In some embodiments, the index value condition (the sudden acceleration operation condition) may be satisfied when the acceleration pedal operation amount AP is equal to or greater than the threshold operation amount APth. That is, the index value condition may be a condition having nothing to do with the acceleration pedal operation speed APV.

In some embodiments, the first threshold time T1th may be set to the same value as the second threshold time T2th. In some embodiments, the first threshold time T1th may be set to a value different from the second threshold time T2th.

The above-described DSECU 10 is configured to perform the driving force decrease control when at least one of the following two mistaken acceleration operation conditions (a condition 1 and a condition 2) are satisfied.

(Condition 1) The time from the shift position changing time point to the condition satisfied time point at which the index value condition is satisfied is equal to shorter than the first threshold time T1th.

(Condition 2) The time from the braking-off time point at which no brake operation is not detected to the condition satisfied time point at which the index value condition is satisfied is equal to or shorter than the second threshold time T2th.

In some embodiments, the DSECU 10 may not perform the driving force decrease control when the condition 1 is satisfied, and the DSECU 10 may perform the driving force decrease control only when the condition 2 is satisfied.

What is claimed is:

1. A driving support device comprising:
   an acceleration operation amount sensor configured to acquire an acceleration operation amount of an acceleration operation member which a driver operates in order to increase driving force generated by a drive device of a vehicle;
   a brake operation sensor configured to determine whether the driver operates a brake operation member which the driver operates in order to increase braking force generated by a brake device of the vehicle;
   a shift position sensor configured to detect a shift position of the vehicle;
   a controller configured to:
      determine that a mistaken acceleration operation condition is satisfied based on a time from a first time point to a second time point being equal to or shorter than a first predetermined threshold time;
      determine that the mistaken acceleration operation condition is satisfied based on a time from a third time point to a fourth time point being equal to or shorter than a second predetermined threshold time, while the shift position is at a reverse position for driving the vehicle backward; and
      based on the mistaken acceleration operation condition being satisfied, vary the driving force in response to the acceleration operation amount smaller than the driving force is varied in response to the acceleration operation amount when the mistaken acceleration operation condition is not satisfied,
   wherein the first time point is a time point at which the shift position sensor detects a shift to the reverse position and the second time point is a time point at which an operation of the acceleration operation member is detected,
   wherein the third time point is a time point at which the brake operation sensor determines that the driver does not operate the brake operation member, and the fourth time point is a time point at which an index value which changes in response to the acceleration operation amount satisfies a predetermined index value condition that is satisfied when the driver performs a predetermined sudden operation of the acceleration operation member, and
   wherein the third time point is at a point in time after the first threshold time has elapsed from the first time point.

2. The driving support device according to claim 1, wherein the controller is further configured to:
   adopt the acceleration operation amount as the index value, and
   determine that the index value satisfies the index value condition when the acceleration operation amount is equal to or greater than a predetermined threshold operation amount.

3. The driving support device according to claim 1, wherein the controller is further configured to:
adopt each of the acceleration operation amount and an increase speed of the acceleration operation amount as the index value, and
determine that the index value satisfies the index value condition when the acceleration operation amount is equal to or greater than a predetermined threshold operation amount and the increase speed of the acceleration operation amount is equal to or higher than a predetermined threshold speed.

4. The driving support device according to claim 1, wherein the controller is further configured to:
determine whether the vehicle is located on a slope which the vehicle goes up when the vehicle is driven backward,
set the threshold time to a third threshold time based on a determination that the vehicle is not located on the slope, and
set the threshold time to a fourth threshold time which is shorter than the third threshold time based on a determination that the vehicle is located on the slope.

5. The driving support device according to claim 1, wherein the second time point is a time point at which the acceleration operation amount sensor detects an increase in the acceleration operation amount from an amount of zero.

6. The driving support device according to claim 1, wherein the third time point is a time point at which an output of the brake operation sensor becomes zero from an amount greater than zero.

7. A driving support device comprising:
an acceleration operation amount sensor configured to acquire an acceleration operation amount of an acceleration operation member which a driver operates in order to increase driving force generated by a drive device of a vehicle;
a brake operation sensor configured to determine whether the driver operates a brake operation member which the driver operates in order to increase braking force generated by a brake device of the vehicle;
a shift position sensor configured to a shift position of the vehicle;
a controller configured to:
obtain a first time point based on a point in time at which the shift position sensor detects a shift to the reverse position;
obtain a second time point based on a point in time at which an operation of the acceleration operation member is detected;
obtain a third time point based on a point in time at which the brake operation sensor detects that the driver has stopped operating the brake operation member;
obtain a fourth time point based on a point in time at which an index value, which changes in response to the acceleration operation amount, satisfies a predetermined index value condition;
determine that a mistaken acceleration operation condition is satisfied based on a time from the first time point to the second time point being equal to or shorter than a first predetermined threshold time;
determine that the mistaken acceleration operation condition is satisfied based on a time from the third time point to the fourth time point being equal to or shorter than a second predetermined threshold time, while the shift position is at a reverse position for driving the vehicle backward; and
based on the mistaken acceleration operation condition being satisfied, vary the driving force in response to the acceleration operation amount smaller than the driving force is varied in response to the acceleration operation amount when the mistaken acceleration operation condition is not satisfied,
wherein the predetermined index value condition is satisfied when the driver performs a predetermined sudden operation of the acceleration operation member, and
wherein the third time point is at a point in time after the first threshold time has elapsed from the first time point.

8. The driving support device according to claim 7, wherein the second time point is a time point at which the acceleration operation amount sensor detects an increase in the acceleration operation amount from an amount of zero.

9. The driving support device according to claim 7, wherein the third time point is a time point at which an output of the brake operation sensor becomes zero from an amount greater than zero.

* * * * *